(12) United States Patent
Freeman et al.

(10) Patent No.: US 9,970,317 B2
(45) Date of Patent: May 15, 2018

(54) VANE ASSEMBLY FOR A GAS TURBINE ENGINE

(71) Applicants: Rolls-Royce North American Technologies, Inc, Indianapolis, IN (US); Rolls-Royce Corporation, Indianapolis, IN (US)

(72) Inventors: Ted J. Freeman, Danville, IN (US); Bruce E. Varney, Greenwood, IN (US); David J. Thomas, Brownsburg, IN (US); Jeffrey A. Walston, Indianapolis, IN (US)

(73) Assignees: Rolls-Royce North America Technologies Inc., Indianapolis, IN (US); Rolls-Royce Corporation, Indianapolis, IN (US)

(*) Notice: Subject to any disclaimer, the term of this patent is extended or adjusted under 35 U.S.C. 154(b) by 321 days.

(21) Appl. No.: 14/869,427

(22) Filed: Sep. 29, 2015

(65) Prior Publication Data

US 2016/0123163 A1  May 5, 2016

Related U.S. Application Data

(60) Provisional application No. 62/073,551, filed on Oct. 31, 2014.

(51) Int. Cl.
| | |
|---|---|
| F01D 9/02 | (2006.01) |
| F01D 25/00 | (2006.01) |
| F01D 5/28 | (2006.01) |
| F01D 9/04 | (2006.01) |
| F01D 9/06 | (2006.01) |

(52) U.S. Cl.
CPC ............ *F01D 25/005* (2013.01); *F01D 5/282* (2013.01); *F01D 5/284* (2013.01); *F01D 9/042* (2013.01); *F01D 9/065* (2013.01); *F05D 2230/642* (2013.01); *F05D 2300/6033* (2013.01); *Y02T 50/672* (2013.01); *Y02T 50/673* (2013.01)

(58) Field of Classification Search
CPC .......... F01D 5/282; F01D 5/284; F01D 9/042; F01D 9/065; F01D 25/005; F05D 2230/642; F05D 2300/6033; Y02T 50/672; Y02T 50/673
See application file for complete search history.

(56) References Cited

U.S. PATENT DOCUMENTS

| | | | | |
|---|---|---|---|---|
| 3,619,077 A | * | 11/1971 | Wile | ................ F01D 5/18 |
| | | | | 415/115 |
| 4,260,326 A | * | 4/1981 | Scott | ................ F01D 9/023 |
| | | | | 415/115 |
| 4,621,976 A | | 11/1986 | Marshall et al. | |
| 4,907,946 A | | 3/1990 | Ciokajlo et al. | |
| 5,630,700 A | | 5/1997 | Olsen et al. | |
| 6,000,375 A | | 12/1999 | Isobe | |
| 6,000,906 A | * | 12/1999 | Draskovich | .......... F01D 5/3084 |
| | | | | 415/189 |

(Continued)

*Primary Examiner* — Igor Kershteyn
(74) *Attorney, Agent, or Firm* — Barnes & Thornburg LLP

(57) ABSTRACT

A vane assembly for a gas turbine engine is disclosed in this paper. The vane assembly includes an inner platform, an outer platform, and a ceramic-containing airfoil. The ceramic-containing airfoil extends from the inner platform to the outer platform. A clamp mechanism couples the inner platform and the outer platform to the ceramic-containing airfoil.

18 Claims, 3 Drawing Sheets

(56) References Cited

U.S. PATENT DOCUMENTS

| | | | | |
|---|---|---|---|---|
| 6,164,903 | A * | 12/2000 | Kouris | F01D 9/04 415/135 |
| 6,514,046 | B1 | 2/2003 | Morrison et al. | |
| 6,543,996 | B2 * | 4/2003 | Koschier | F01D 5/186 415/200 |
| 6,884,030 | B2 * | 4/2005 | Darkins, Jr. | F01D 9/042 29/889.22 |
| 7,114,917 | B2 * | 10/2006 | Legg | F01D 9/04 415/137 |
| 7,326,030 | B2 * | 2/2008 | Albrecht | F01D 5/147 415/115 |
| 7,452,182 | B2 * | 11/2008 | Vance | F01D 5/14 415/135 |
| 7,625,170 | B2 * | 12/2009 | Greene | F01D 5/147 415/110 |
| 8,096,758 | B2 | 1/2012 | Schiavo | |
| 8,206,087 | B2 | 6/2012 | Campbell et al. | |
| 8,206,098 | B2 | 6/2012 | Prill et al. | |
| 8,210,803 | B2 | 7/2012 | Schaff et al. | |
| 8,251,652 | B2 | 8/2012 | Campbell et al. | |
| 8,292,580 | B2 | 10/2012 | Schiavo et al. | |
| 2012/0189427 | A1 | 7/2012 | Kwon et al. | |
| 2013/0177411 | A1 | 7/2013 | Weber et al. | |

\* cited by examiner

VANE ASSEMBLY FOR A GAS TURBINE ENGINE

CROSS REFERENCE TO RELATED APPLICATIONS

This application claims priority to and the benefit of U.S. Provisional Patent Application No. 62/073,551, filed 31 Oct. 2014, the disclosure of which is now expressly incorporated herein by reference.

FIELD OF THE DISCLOSURE

The present disclosure relates generally to vanes for gas turbine engines. More specifically, the present disclosure relates to vanes that are assembled from ceramic-containing and metallic components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high temperature materials and/or to be actively cooled by supplying relatively cool air to the vanes and blades. To this end, some airfoils for vanes and blades are being made from composite materials adapted to withstand very high temperatures. Design and manufacture of vanes and blades from composite materials presents challenges because of the complex geometry and strength required for the parts.

SUMMARY

The present disclosure may comprise one or more of the following features and combinations thereof.

According to one aspect of the present disclosure, a vane assembly for a gas turbine engine is taught. The vane assembly may include an inner platform, an outer platform, and a ceramic-containing airfoil. The ceramic-containing airfoil may extend from the inner platform to the outer platform.

In some embodiments, the ceramic-containing airfoil may be received in the inner platform and the outer platform. Accordingly, substantially all aerodynamic loads applied to the ceramic-containing airfoil may be transferred directly to the inner platform and the outer platform.

In some embodiments, the vane assembly may include a clamp mechanism. The clamp mechanism may extend from the inner platform to the outer platform through a hollow core of the ceramic-containing airfoil to couple the inner platform and the outer platform to the ceramic-containing airfoil. The clamp mechanism may maintain a spaced-apart relationship with the ceramic-containing airfoil so that aerodynamic loads applied to the ceramic-containing airfoil bypass the clamp mechanism.

In some embodiments, the clamp mechanism may include a perforated impingement tube that extends through the hollow core of the ceramic-containing airfoil to conduct cooling air into the ceramic-containing airfoil. The clamp mechanism may include an inner plate spaced apart from the ceramic-containing airfoil by the inner platform and an outer plate spaced apart from the ceramic-containing airfoil by the outer platform. In some embodiments, the inner plate may be coupled to the outer plate by a shaft that extends through the perforated impingement tube.

In some embodiments, the outer plate may be coupled to the perforated impingement tube for movement therewith and may be biased away from the inner platform by a biasing member. The inner plate may be coupled to the perforated impingement tube for movement therewith.

In some embodiments, the inner platform may be formed to include an inner panel and a first opening that receives a portion of the ceramic-containing airfoil. The inner platform may include an inner retention lip that extends from the inner panel toward the outer platform to define at least a portion of the first opening. The inner retention lip may have an airfoil shape when viewed from the outer platform that is sized to correspond to the ceramic-containing airfoil received in the first opening.

In some embodiments, the inner panel of the inner platform may be formed to include an aperture. The aperture may be in communication with the first opening through which the clamp mechanism extends into the hollow core of the ceramic-containing airfoil.

In some embodiments, the outer platform may be formed to include an outer panel and a second opening that receives a portion of the ceramic-containing airfoil. The outer panel of the outer platform may be formed to include an aperture in communication with the second opening through which the clamp mechanism extends into the hollow core of the ceramic-containing airfoil.

In some embodiments, the outer platform may include an outer retention lip that extends from the outer panel toward the inner platform to define at least a portion of the second opening. The outer retention lip may have an airfoil shape when viewed from the inner platform that is sized to correspond to the ceramic-containing airfoil received in the second opening.

According to another aspect of the present disclosure, a vane assembly for a gas turbine engine may include an inner platform formed to include an inner panel and a first opening, an outer platform formed to include an outer panel and a second opening, and a ceramic-containing airfoil. The ceramic-containing airfoil may engage the inner platform around the first opening and may engage the outer platform around the second opening so that substantially all aerodynamic loads applied to the ceramic-containing airfoil are transferred directly to the inner platform and the outer platform.

In some embodiments, the vane assembly may include a clamp mechanism that extends from the inner platform to the outer platform. The clamp mechanism may extend through a hollow core of the ceramic-containing airfoil to couple the inner platform and the outer platform to the ceramic-containing airfoil.

In some embodiments, the inner platform may include an inner retention lip that extends from the inner panel toward the outer platform to define at least a portion of the first opening. The inner retention lip may have an airfoil shape when viewed from the outer platform that is sized to correspond to the ceramic-containing airfoil received in the first opening.

In some embodiments, the outer platform may include an outer retention lip that extends from the outer panel toward the inner platform to define at least a portion of the second opening. The outer retention lip may have an airfoil shape when viewed from the inner platform that is sized to correspond to the ceramic-containing airfoil.

In some embodiments, the clamp mechanism may include a perforated impingement tube that extends through the hollow core of the ceramic-containing airfoil to conduct cooling air into the ceramic-containing airfoil.

In some embodiments, the clamp mechanism may include an inner plate spaced apart from the ceramic-containing airfoil by the inner platform and an outer plate spaced apart from the ceramic-containing airfoil by the outer platform. The inner plate may be coupled to the outer plate by a shaft that extends from the inner plate to the outer plate.

In some embodiments, the inner plate and the outer plate may be coupled to the perforated impingement tube for movement therewith. The clamp mechanism may be biased away from the inner platform by a biasing member arranged between the outer plate and the outer platform.

According to another aspect of the present disclosure, a method of assembling a vane assembly for a gas turbine engine is taught. The method may include positioning a portion of a ceramic-containing airfoil into a first opening formed in an inner platform so that the ceramic-containing airfoil engages the inner platform around the first opening. The method may also include positioning another portion of the ceramic-containing airfoil into a second opening formed in an outer platform so that the ceramic-containing airfoil engages the outer platform around the second opening.

In some embodiments, the method may include coupling the inner platform and the outer platform to the ceramic-containing airfoil using a clamp mechanism. The clamp mechanism may extend through a hollow core formed in the ceramic-containing airfoil without engaging the airfoil.

These and other features of the present disclosure will become more apparent from the following description of the illustrative embodiments.

DETAILED DESCRIPTION OF THE DRAWINGS

Figure 1:
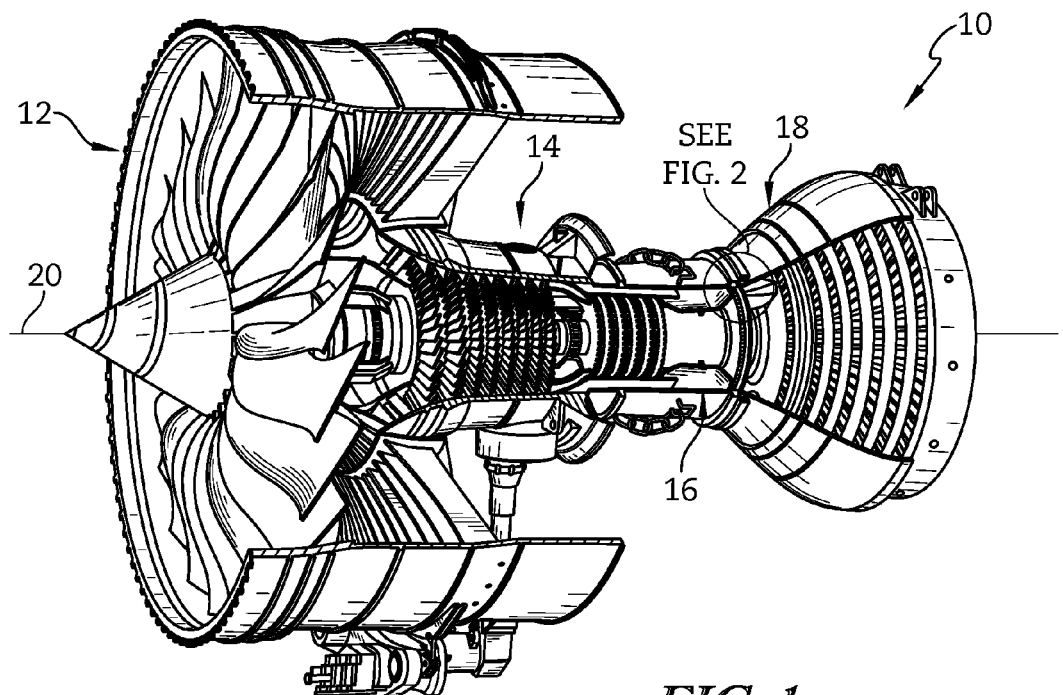
FIG. 1 is a perspective view of a gas turbine engine showing that a portion of a turbine assembly is arranged to receive hot, high pressure combustion products from a combustor.

For the purposes of promoting an understanding of the principles of the disclosure, reference will now be made to a number of illustrative embodiments illustrated in the drawings and specific language will be used to describe the same.

An illustrative aerospace gas turbine engine 10 is cut-away in FIG. 1 to show that the engine 10 includes a fan 12, a compressor 14, a combustor 16, and a turbine 18. The fan 12 is driven by the turbine 18 and provides thrust for propelling an air vehicle (not shown). The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about an axis 20 and drive the compressor 14 and the fan 12.

Figure 2:
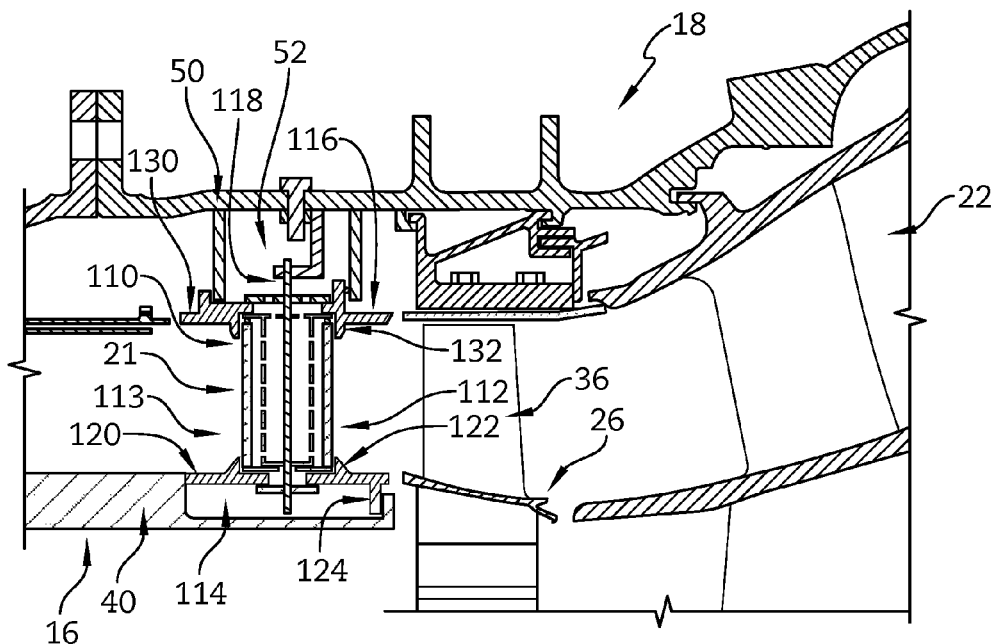
FIG. 2 is a cross-sectional view of the portion of the turbine assembly noted in FIG. 1 that is adjacent to the combustor showing that the turbine assembly includes a multi-component vane assembly that redirects hot, high pressure combustion products before they interact with a bladed turbine wheel.

Referring now to FIG. 2, a portion of the turbine 18 is shown to include first and second static turbine vane rings 21, 22 and a turbine wheel assembly 26. The vane rings 21, 22 extend across the flow path of the hot, high-pressure combustion products from the combustor 16 to direct the combustion products toward blades 36 of the turbine wheel assembly 26. The blades 36 are in turn pushed by the combustion products to cause the turbine wheel assembly 26 to rotate; thereby, driving the rotating components of the compressor 14 and the fan 12.

Figure 3:
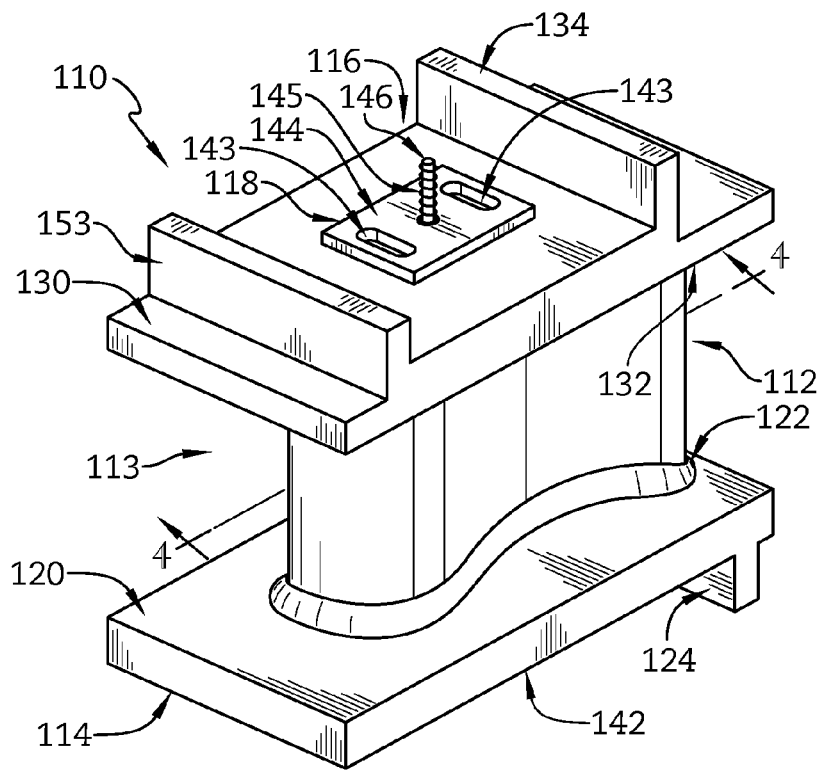
FIG. 3 is a perspective view of the vane assembly of FIG. 2 showing that the vane assembly includes inner and outer platforms, an airfoil that extends between, and a clamp mechanism that couples the airfoil to the platforms.
Figure 4:
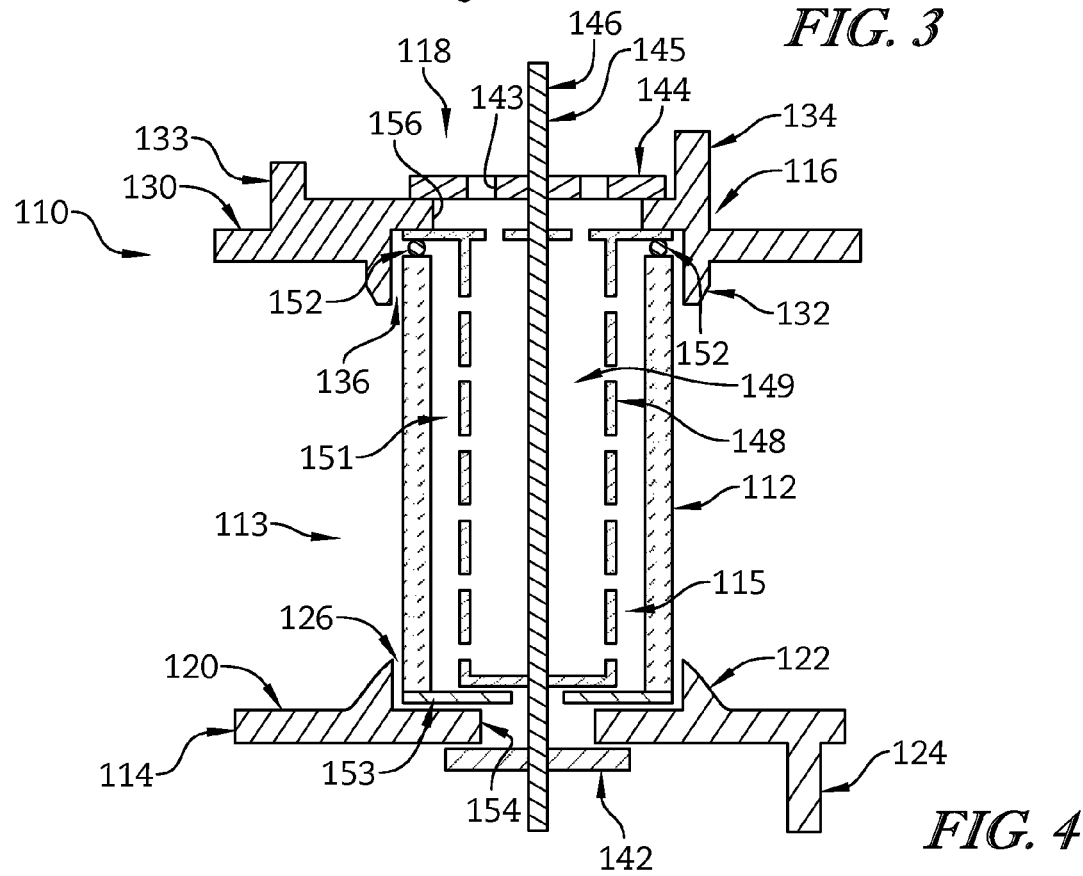
FIG. 4 is a detail cross-sectional view of the vane assembly shown in FIGS. 2 and 3 showing that the airfoil is received in the inner and outer platforms so that aerodynamic loads applied to the airfoil are passed to the platforms.

The first vane ring 21 is illustratively made up of a plurality of individual vane assemblies 110 as shown in FIGS. 3 and 4. The vane assemblies 110 are arranged circumferentially adjacent to one another to form a ring that extends around the axis 20. In the illustrative embodiment, each vane assembly 110 includes a single airfoil 112 that extends across a gas path 113 defined by the assembly 110 and has an aerodynamic shape so that the airfoil 112 directs combustion products from the combustor 16 toward blades 36 of the turbine wheel assembly 26. In some embodiments, each vane assembly 110 may include more than one airfoil 112.

In order to withstand the temperatures applied by the hot, high-pressure combustion products from the combustor 16, the first vane assembly 110 includes a ceramic-containing airfoil 112 shown in FIG. 2. Ceramic-containing components, like the airfoil 112, are adapted to withstand very high operating temperatures that might not be possible for metallic components. In the illustrative embodiment, the airfoil 112 is made from a ceramic-containing material; and, more particularly, a ceramic matrix composite (CMC). Even more particularly, the illustrative airfoil 112 is made from a SiC—SiC ceramic matrix composite including a silicon carbide matrix and silicon carbide fibers. For purposes of this application, a ceramic-containing material is any monolithic ceramic or composite in which at least one constituent is a ceramic.

The vane assembly 110 also includes an inner platform 114 and an outer platform 116 coupled to opposing ends of the airfoil 112 to support the airfoil 112 as shown in FIGS. 2-4. A clamp mechanism 118 included in the vane assembly 110 extends from the inner platform 114 to the outer platform 116 through a hollow core 115 formed in the airfoil 112 to couple the platforms 114, 116 to the airfoil 112. In the illustrative embodiment, substantially all aerodynamic loads applied to the airfoil 112 are transferred directly to the inner platform and the outer platform 114, 116 while bypassing the clamp mechanism 118 shielded inside the airfoil 112.

The inner platform 114 is adapted to be coupled to a combustor case 40 and to transfer aerodynamic loads from the airfoil 112 to the combustor case 40 as shown in FIG. 2. The inner platform 114 is illustratively a monolithic component that includes an inner panel 120, an inner lip 122, and an inner attachment flange 124 as shown in FIGS. 3 and 4. The inner panel 120 defines one side of the gas path 113. The inner lip 122 extends from the inner panel 120 toward the outer platform 116 and provides an inner opening 126 that receives a portion of the airfoil 112. The inner attachment flange 124 extends from the inner panel 120 away from the outer platform 116 to engage the combustor case 40 and transmit loads from the inner platform 114 to the combustor case 40.

The outer platform 116 is adapted to be coupled to a turbine case 50 and to transfer aerodynamic loads from the airfoil 112 to the turbine case 50 as shown in FIG. 2. The outer platform 116 is illustratively a monolithic component that includes an outer panel 130, an outer lip 132, and outer attachment flanges 133, 134 as shown in FIGS. 3 and 4. The outer panel 130 defines one side of the gas path 113. The outer lip 132 extends from the outer panel 130 toward the inner platform 114 and provides an outer opening 136 that receives a portion of the airfoil 112. The outer attachment flanges 133, 134 extend from the outer panel 130 away from the inner platform 114 to engage the turbine case 50 and transmit loads from the outer platform 116 to the turbine case 50.

The clamp mechanism 118 maintains a spaced-apart relationship with the airfoil 112 so that aerodynamic loads applied to the airfoil 112 bypass the clamp mechanism 118 as suggested in FIGS. 2 and 4. The clamp mechanism 118 illustratively includes an inner plate 142, an outer plate 144, and a threaded shaft 146. The inner plate 142 is spaced apart from the airfoil 112 by the inner platform 114. The outer plate 144 is spaced apart from the airfoil 112 by the outer platform 116. The threaded shaft 146 has threads 145 engaged with the plates 142,144 and is rotatable to move the inner plate 142 toward or away from the outer plate 144. In some embodiments, the shaft 146 may be unthreaded and may be coupled to the plates 142, 144 by welds, bi-cast joints, or other coupling means. In some embodiments, the inner and/or outer plate 144 may be nuts or other threaded or unthreaded components that are engaged by the threaded shaft 146.

In the illustrative embodiment, the clamp mechanism 118 also includes a perforated impingement tube 148 as shown in FIG. 4. The perforated impingement tube 148 extends through the hollow core 115 of the airfoil 112 and conducts cooling air into the airfoil 112. The illustrative perforated impingement tube 148 is in fluid communication with an outer cooling air chamber 52 by way of inlet holes 143 formed in outer plate 144 of the clamp mechanism 118. The threaded shaft 146 illustratively extends through a cannula 149 of the perforated impingement tube 148 inside the airfoil 112. The perforated impingement tube 148 is insulated from temperatures of the airfoil 112 by an air gap 151, ceramic ropes 152, a ceramic washer 153 as shown, for example, in FIG. 4.

Referring again to the inner platform 114 shown in FIG. 4, the inner panel 120 of the inner platform 114 is formed to include an aperture 154. The aperture 154 is in communication with the inner opening 126 that receives a portion of the airfoil 112. The aperture 154 also allows the threaded shaft 146 of the clamp mechanism 118 to extend from outside the airfoil 112 into the hollow core 115 of the airfoil 112.

Referring again to the outer platform 116 shown in FIG. 4, the outer panel 130 of the outer platform 116 is formed to include an aperture 156. The aperture 156 is in communication with the outer opening 136 that receives a portion of the airfoil 112. The aperture 156 also allows the threaded shaft 146 of the clamp mechanism 118 to extend from outside the airfoil 112 into the hollow core 115 of the airfoil 112.

According to one method of assembling the vane assembly 110, a portion of the airfoil 112 is positioned into the inner opening 126 formed in the inner platform 114 so that the airfoil 112 engages the inner platform 114 around the inner opening 126 as shown in FIGS. 3 and 4. Another portion of the airfoil 112 is positioned into the outer opening 136 formed in the outer platform 116 so that the airfoil 112 engages the outer platform 116 around the outer opening 136.

The inner and outer platforms 114, 116 are coupled to the airfoil 112 using the clamp mechanism 118. To use the clamp mechanism 118, the perforated impingement tube 148 is positioned in the hollow core 115 of the airfoil 112. The inner and outer plates 142, 144 are then engaged with the respective inner and outer platforms 114, 116. The threaded shaft 146 is then inserted through the plates 142, 144, the platforms 114, 116, and the tube 148 in the hollow core 115. The threaded shaft 146 is then turned so that the threads 145 engaging the plates 142, 144 are pulled toward one another to clamp the vane assembly 110 together.

Figure 5:
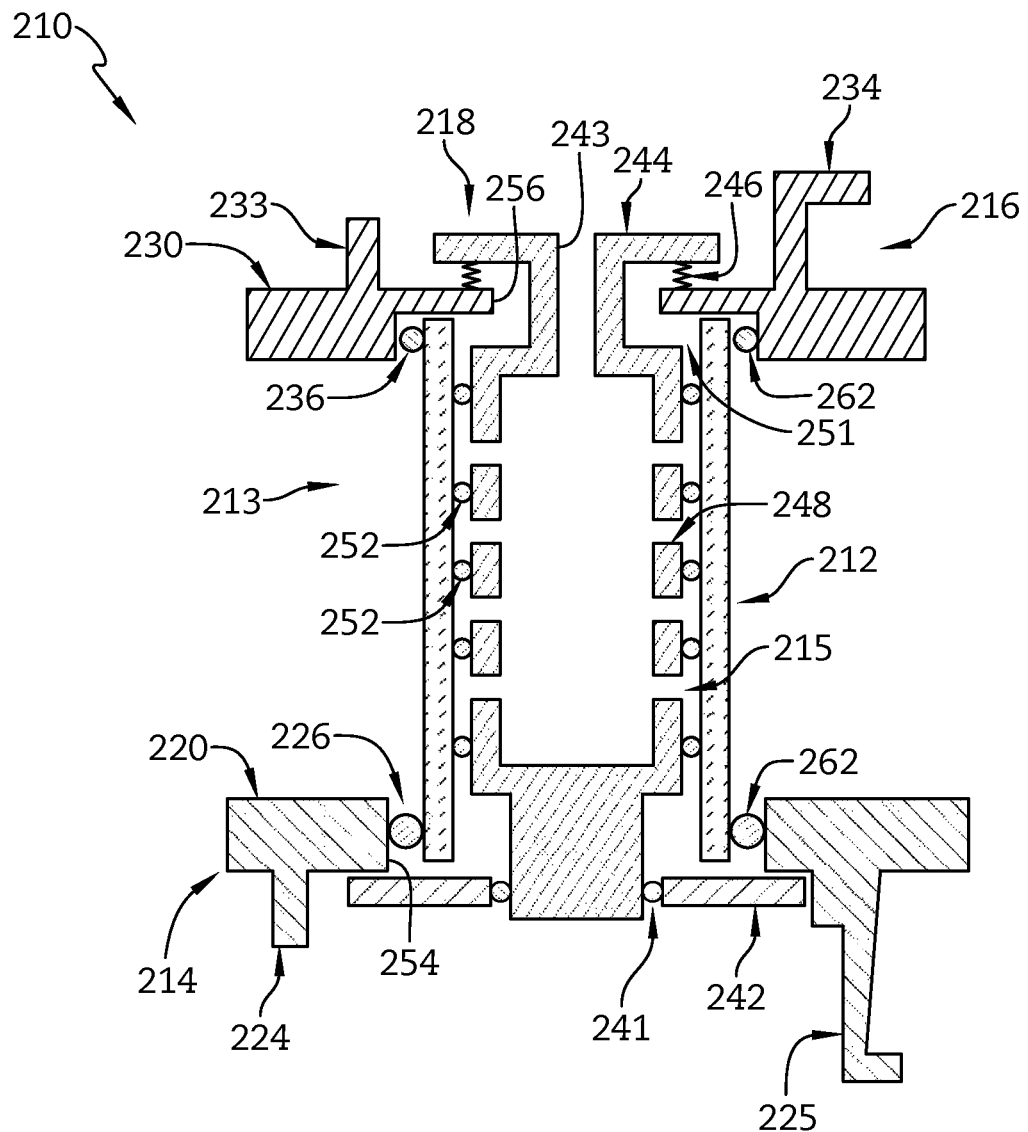
FIG. 5 is a detail cross-sectional view of another vane assembly showing that the vane assembly includes inner and outer platforms, an airfoil that extends between the platforms, and a clamp mechanism that couples the airfoil to the platforms and showing that the airfoil is received in the inner and outer platforms so that aerodynamic loads applied to the airfoil are passed to the platforms.

Another illustrative vane assembly 210 is shown in FIG. 5. The vane assembly 210 includes a ceramic-containing airfoil 212, an inner platform 214, and an outer platform 216. The inner and outer platforms 214, 216 are coupled to opposing ends of the airfoil 212 to support the airfoil 212. A clamp mechanism 218 included in the vane assembly 210 extends from the inner platform 214 to the outer platform 216 through a hollow core 215 formed in the airfoil 212 to couple the platforms 214, 216 to the airfoil 212. In the illustrative embodiment, substantially all aerodynamic loads applied to the airfoil 212 are transferred directly to the inner platform and the outer platform 214, 216 while bypassing the clamp mechanism 218 shielded inside the airfoil 212.

The inner platform 214 is adapted to be coupled to a combustor case and to transfer aerodynamic loads from the airfoil 112 to the combustor case as suggested in FIG. 5. The inner platform 214 is illustratively a monolithic component that includes an inner panel 220 and inner attachment flanges 224, 225. The inner panel 220 defines one side of a gas path 213 and provides an inner opening 226 that receives a portion of the airfoil 212. The inner attachment flanges 224, 225 extends from the inner panel 220 away from the outer platform 216 to engage the combustor case and transmit loads from the inner platform 214 to the combustor case.

The outer platform 216 is adapted to be coupled to a turbine case and to transfer aerodynamic loads from the airfoil 212 to the turbine case as suggested in FIG. 5. The outer platform 216 is illustratively a monolithic component that includes an outer panel 230 and outer attachment flanges 233, 234. The outer panel 230 defines one side of the gas path 213 and provides an outer opening 236 that receives a portion of the airfoil 212. The outer attachment flanges 233, 234 extend from the outer panel 230 away from the inner platform 214 to engage the turbine case and transmit loads from the outer platform 216 to the turbine case.

The clamp mechanism 218 maintains a spaced-apart relationship with the airfoil 212 so that aerodynamic loads applied to the airfoil 212 bypass the clamp mechanism 218 as suggested in FIG. 5. The clamp mechanism 218 illustratively includes an inner plate 242, an outer plate 244, a biasing spring 246 and a perforated impingement tube 248. The inner plate 242 is spaced apart from the airfoil 212 by the inner platform 214. The outer plate 244 is spaced apart from the airfoil 212 by the outer platform 216. The spring 246 is illustratively a compression spring arranged between the outer plate 244 and the outer platform 216 but may be other biasing members arranged in other configurations (e.g. leaf springs, tension springs, etc.). The perforated impingement tube 248 is illustratively monolithically formed with the outer plate 244 and is bonded to the inner plate 242 for movement therewith by a bi-cast joint 241.

The perforated impingement tube 248 extends through the hollow core 215 of the airfoil 212 and conducts cooling air into the airfoil 212. The illustrative perforated impingement tube 248 is in fluid communication with an outer cooling air chamber by way of an inlet holes 243 formed in outer plate 244 of the clamp mechanism 218. The perforated impingement tube 248 is insulated from temperatures of the airfoil 212 by an air gap 251 and ceramic ropes 252. Ceramic ropes 262 adapted to transmit load may also be used to separate the airfoil 212 from the inner and the outer platform 214, 216 as shown in FIG. 5.

Referring again to the inner platform 214 shown in FIG. 5, the inner panel 220 of the inner platform 214 is formed to include an aperture 254. The aperture 254 is in communication with the inner opening 226 that receives a portion of the airfoil 212. The aperture 254 also allows the perforated impingement tube 248 of the clamp mechanism 218 to extend from outside the airfoil 212 into the hollow core 215 of the airfoil 212.

Referring again to the outer platform 216 shown in FIG. 5, the outer panel 230 of the outer platform 216 is formed to include an aperture 256. The aperture 256 is in communication with the outer opening 236 that receives a portion of the airfoil 212. The aperture 256 also allows the perforated impingement tube 248 of the clamp mechanism 218 to extend from outside the airfoil 212 into the hollow core 215 of the airfoil 212.

According to one method of assembling the vane assembly 210, a portion of the airfoil 212 is positioned into the inner opening 226 formed in the inner platform 214 so that the airfoil 212 engages the inner platform 214 around the inner opening 226 as shown in FIG. 5. Another portion of the airfoil 212 is positioned into the outer opening 236 formed in the outer platform 216 so that the airfoil 212 engages the outer platform 216 around the outer opening 236.

The inner and outer platforms 214, 216 are coupled to the airfoil 212 using the clamp mechanism 218. To use the clamp mechanism 218, the perforated impingement tube 248 is positioned in the hollow core 215 of the airfoil 212. The inner plate 242 is then engaged with the inner platform 114. And the outer plate 244 is biased away from the outer platform 116 by the spring 246. The inner plate 242 is then bi-cast to the perforated impingement tube 248 forming the bi-cast joint 241.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly for a gas turbine engine, the assembly comprising
   an inner platform,
   an outer platform,
   a ceramic-containing airfoil that extends from the inner platform to the outer platform and is received in the inner platform and the outer platform so that substantially all aerodynamic loads applied to the ceramic-containing airfoil are transferred directly to the inner platform and the outer platform, and
   a clamp mechanism that extends from the inner platform to the outer platform through a hollow core of the ceramic-containing airfoil to couple the inner platform and the outer platform to the ceramic-containing airfoil while maintaining a spaced-apart relationship with the ceramic-containing airfoil so that aerodynamic loads applied to the ceramic-containing airfoil bypass the clamp mechanism, wherein the clamp mechanism includes a perforated impingement tube that extends through the hollow core of the ceramic-containing airfoil to conduct cooling air into the ceramic-containing airfoil.

2. The vane assembly of claim 1, wherein the clamp mechanism includes an inner plate spaced apart from the ceramic-containing airfoil by the inner platform and an outer plate spaced apart from the ceramic-containing airfoil by the outer platform.

3. The vane assembly of claim 2, wherein the inner plate is coupled to the outer plate by a shaft that extends through the perforated impingement tube.

4. The vane assembly of claim 2, wherein the outer plate is coupled to the perforated impingement tube for movement therewith and is biased away from the inner platform by a biasing member.

5. The vane assembly of claim 4, wherein the inner plate is coupled to the perforated impingement tube for movement therewith.

6. The vane assembly of claim 1, wherein the inner platform is formed to include an inner panel and a first opening that receives a portion of the ceramic-containing airfoil.

7. The vane assembly of claim 6, wherein the inner platform includes an inner retention lip that extends from the inner panel toward the outer platform to define at least a portion of the first opening and the inner retention lip has an airfoil shape when viewed from the outer platform that is sized to correspond to the ceramic-containing airfoil received in the first opening.

8. The vane assembly of claim 6, wherein the inner panel of the inner platform is formed to include an aperture in communication with the first opening through which the clamp mechanism extends into the hollow core of the ceramic-containing airfoil.

9. The vane assembly of claim 6, wherein the outer platform is formed to include an outer panel and a second opening that receives a portion of the ceramic-containing airfoil.

10. The vane assembly of claim 9, wherein the outer panel of the outer platform is formed to include an aperture in communication with the second opening through which the clamp mechanism extends into the hollow core of the ceramic-containing airfoil.

11. The vane assembly of claim 10, wherein the outer platform includes an outer retention lip that extends from the outer panel toward the inner platform to define at least a portion of the second opening and the outer retention lip has an airfoil shape when viewed from the inner platform that is sized to correspond to the ceramic-containing airfoil received in the second opening.

12. A vane assembly for a gas turbine engine, the assembly comprising
an inner platform formed to include an inner panel and a first opening,
an outer platform formed to include an outer panel and a second opening,
a ceramic-containing airfoil that engages the inner platform around the first opening and engages the outer platform around the second opening so that substantially all aerodynamic loads applied to the ceramic-containing airfoil are transferred directly to the inner platform and the outer platform, and
a clamp mechanism that extends from the inner platform to the outer platform through a hollow core of the ceramic-containing airfoil to couple the inner platform and the outer platform to the ceramic-containing airfoil,
wherein the inner platform includes an inner retention lip that extends from the inner panel toward the outer platform to define at least a portion of the first opening and the inner retention lip has an airfoil shape when viewed from the outer platform that is sized to correspond to the ceramic-containing airfoil received in the first opening.

13. A vane assembly for a gas turbine engine, the assembly comprising
an inner platform formed to include an inner panel and a first opening,
an outer platform formed to include an outer panel and a second opening,
a ceramic-containing airfoil that engages the inner platform around the first opening and engages the outer platform around the second opening so that substantially all aerodynamic loads applied to the ceramic-containing airfoil are transferred directly to the inner platform and the outer platform, and
a clamp mechanism that extends from the inner platform to the outer platform through a hollow core of the ceramic-containing airfoil to couple the inner platform and the outer platform to the ceramic-containing airfoil,
wherein the outer platform includes an outer retention lip that extends from the outer panel toward the inner platform to define at least a portion of the second opening and the outer retention lip has an airfoil shape when viewed from the inner platform that is sized to correspond to the ceramic-containing airfoil.

14. A vane assembly for a gas turbine engine, the assembly comprising
an inner platform formed to include an inner panel and a first opening,
an outer platform formed to include an outer panel and a second opening,
a ceramic-containing airfoil that engages the inner platform around the first opening and engages the outer platform around the second opening so that substantially all aerodynamic loads applied to the ceramic-containing airfoil are transferred directly to the inner platform and the outer platform, and
a clamp mechanism that extends from the inner platform to the outer platform through a hollow core of the ceramic-containing airfoil to couple the inner platform and the outer platform to the ceramic-containing airfoil,
wherein the clamp mechanism includes a perforated impingement tube that extends through the hollow core of the ceramic-containing airfoil to conduct cooling air into the ceramic-containing airfoil.

15. The vane assembly of claim 14, wherein the clamp mechanism includes an inner plate spaced apart from the ceramic-containing airfoil by the inner platform and an outer plate spaced apart from the ceramic-containing airfoil by the outer platform.

16. The vane assembly of claim 15, wherein the inner plate is coupled to the outer plate by a shaft that extends from the inner plate to the outer plate.

17. The vane assembly of claim 15, wherein the inner plate and the outer plate are coupled to the perforated impingement tube for movement therewith and the clamp mechanism is biased away from the inner platform by a biasing member arranged between the outer plate and the outer platform.

18. A method of assembling a vane assembly for a gas turbine engine, the method comprising
positioning a portion of a ceramic-containing airfoil into a first opening formed in an inner platform so that the ceramic-containing airfoil engages the inner platform around the first opening,
positioning another portion of the ceramic-containing airfoil into a second opening formed in an outer platform so that the ceramic-containing airfoil engages the outer platform around the second opening, and
coupling the inner platform and the outer platform to the ceramic-containing airfoil using a clamp mechanism that extends through a hollow core formed in the ceramic-containing airfoil without engaging the airfoil, wherein the clamp mechanism includes a perforated impingement tube that extends through the hollow core of the ceramic-containing airfoil to conduct cooling air into the ceramic-containing airfoil.

\* \* \* \* \*